July 2, 1935.　　　R. M. BAGLEY　　　2,006,532
METERED GREASE DISPENSER
Filed Jan. 14, 1932　　3 Sheets-Sheet 2
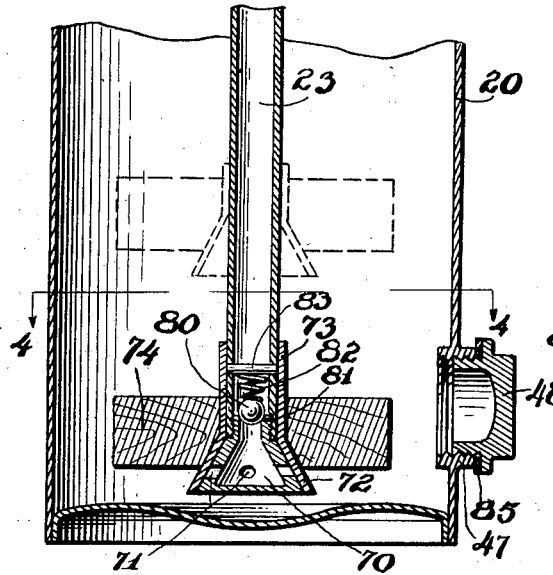
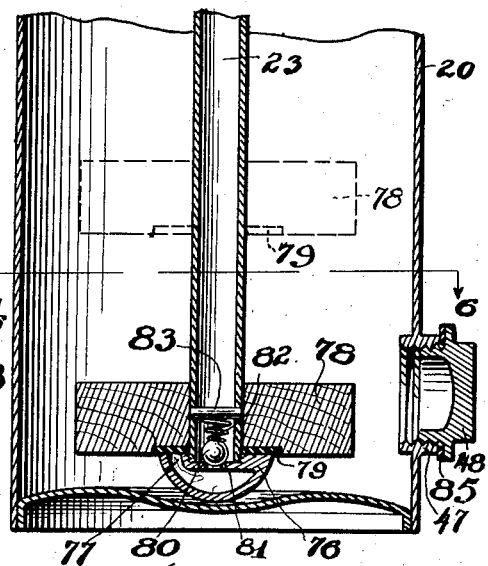
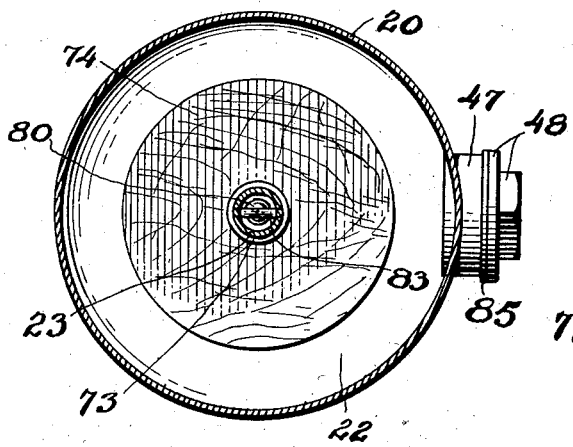
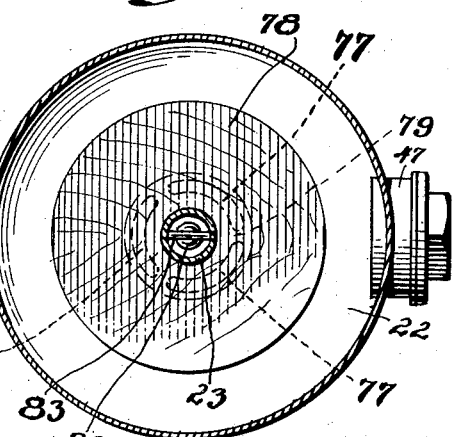
INVENTOR.
ROBERT M. BAGLEY
BY
　　Leonard L. Kalish
　　　　ATTORNEY.

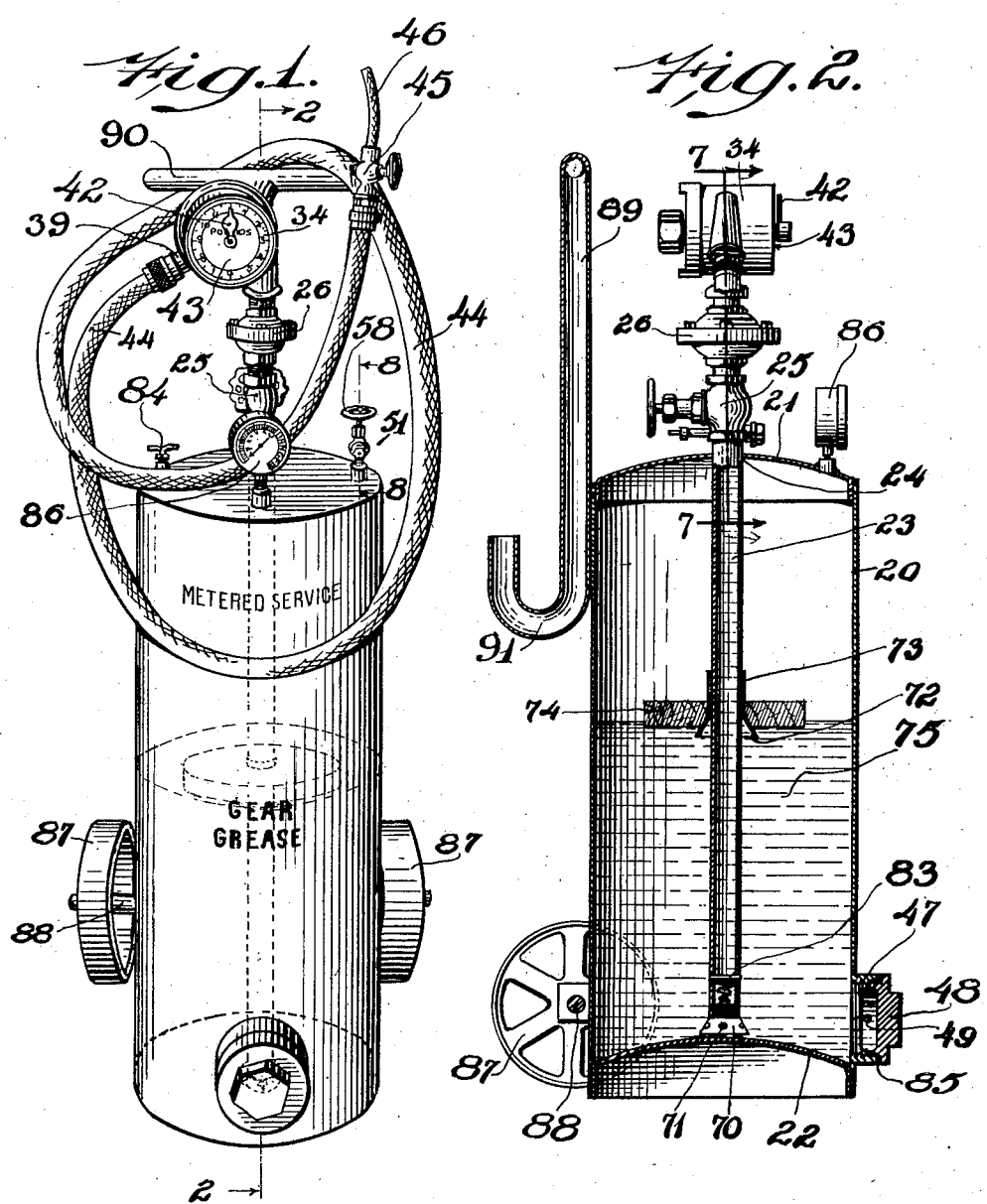

July 2, 1935.  R. M. BAGLEY  2,006,532
METERED GREASE DISPENSER
Filed Jan. 14, 1932    3 Sheets-Sheet 3

INVENTOR.
ROBERT M. BAGLEY.
BY
*Leonard L. Kalish*
ATTORNEY.

Patented July 2, 1935

2,006,532

UNITED STATES PATENT OFFICE 2,006,532

METERED GREASE DISPENSER

Robert M. Bagley, Haddonfield, N. J.

Application January 14, 1932, Serial No. 586,558

2 Claims. (Cl. 221—95)

My invention relates to a new and useful metered grease dispenser, and it relates more particularly to a dispensing device for delivering grease under suitable pressure through a hose, which will not only accurately measure the amount of grease delivered, but which will automatically eliminate errors in measuring when the dispensing device is empty.

The object of my invention is to provide a grease dispensing device wherein the grease is displaced or removed from the reservoir by air pressure within such reservoir and whereby the grease is forced through a measuring device, prior to its ultimate discharge, by said air pressure:—without however permitting the compressed air to pass through the measuring device, so as to produce a false reading on the latter.

With the above and other objects in view, which will appear more fully from the following detailed description, my invention consists of a normally closed vessel or reservoir, into which a suitable quantity of grease or other lubricant is adapted to be placed, a metering device operatively connected to said reservoir with its intake opening positioned or extended in proximity to the bottom of the body of grease or lubricant, a flexible discharge hose including a manually operable valve for controlling the flow of lubricant from said reservoir through said metering device and through said hose, and means for supplying air under pressure into said reservoir on top of the grease or lubricant, and means within said reservoir, and controlled by the height of the body of grease or lubricant, for closing the grease intake opening leading to the metering device when the level of lubricant reaches a certain low point, thereby to shut off the flow of lubricant automatically and prevent the passage of compressed air through the metering device.

My invention further consists of other novel features of construction which will appear more fully from the following description.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized, and that my invention is not limited to the precise arrangement and organization of the instrumentalities as herein shown and described.

Referring to the drawings in which like reference characters indicate like parts, Figure 1 represents a perspective view of a metered grease dispenser embodying my invention;

Figure 2 represents a vertical sectional view taken generally on line 2—2 of Figure 1;

Figure 3 represents an enlarged sectional view of the bottom of the reservoir, as shown in Figure 2;

Figure 4 represents a section on line 4—4 of Figure 3;

Figure 5 represents a vertical sectional view of the bottom of the reservoir, showing a modified form of construction embodying my invention;

Figure 6 represents a section on line 6—6 of Figure 5;

Figure 7:
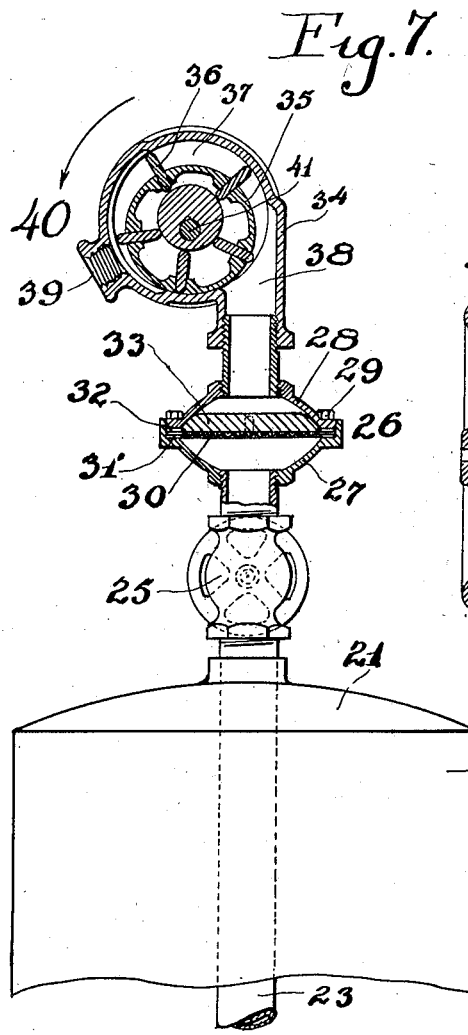
Figure 7 represents a section on line 7—7 of Figure 2, on an enlarged scale.

In carrying out my invention I may provide any suitable reservoir 20, which is preferably in the form of a cylindrical steel tank having a top 21 and bottom 22, preferably welded or riveted thereto. Through the top 21 of the tank 20, an intake pipe 23 is extended, suitably sealed to the top of the tank by welding or the like at its juncture 24. A main control valve 25 is provided on top of the intake pipe 23, as indicated particularly in Figure 2, said valve 25 being of any suitable type, such as globe valve, plug valve, or the like. To the other side of the main control valve 25 a strainer 26 is operatively secured;—said strainer comprising particularly two somewhat similar and separable housing members 27 and 28 respectively, having coacting annular flanges which are detachably secured to each other by a series of bolts or screws 29. A metallic screen 30 of suitable mesh is interposed between the two strainer housing members 27 and 28 with the periphery thereof clamped between the annular flanges of said casings 27 and 28. Annular washers or gaskets 31 and 32 are also preferably placed on either side of the screen, intermediate the periphery of said screen and the corresponding housing members 27 and 28, respectively, so as to seal said housing securely against the leakage of grease or lubricant. A transverse reinforcing or supporting spider member 33 is placed on one side of the screen farthest from the source of grease supply, so as to support the screen 30 against the pressure of the grease flowing therethrough.

To the other side of the strainer housing, a metering device 34 is secured, having an eccentric rotor 35 disposed within the cylindrical chamber of the housing of the metering device and provided with a series of blades 36 for sealing the eccentric measuring chamber 37. The grease enters at 38 and is discharged at 39, causing a rotation of the rotor 35 in the direction of the arrow 40. The rotation of the rotor 35 is transmitted through a central shaft 41 to a pointer 42, positioned in front of the dial 43 on the face of the metering device. Any suitable reduction gearing is interposed between the shaft 41 and the shaft of the pointer 42, so that the desired calibration may be obtained.

A flexible hose 44 is secured to the discharge opening 39 of the metering device 34, and to the free end of the flexible hose 44 a manual control valve 45 is secured, having a discharge nozzle 46, through which the grease or lubricant is finally discharged into the gear case of the automobile or other machine requiring the lubricant. In the novel operation of the machine, the main control valve 25 is maintained open constantly, while the secondary control valve 45 at the end of the hose 44 is used for starting and stopping the flow of lubricant.

Near the bottom of the tank 20 a flanged inlet opening 47 is provided, through which the grease may be filled into the tank, when the latter is empty;—the filling being accomplished while the tank is placed in a horizontal position with the opening 47 on top. The flanged opening 47 is screw-threaded internally and the correspondingly screw-threaded plug 48 is threaded into the opening, thereby to close the same, while the dispensing device is in use. A safety release hole 49 is provided through the threaded flange 50 of the plug 48.

Figure 8:
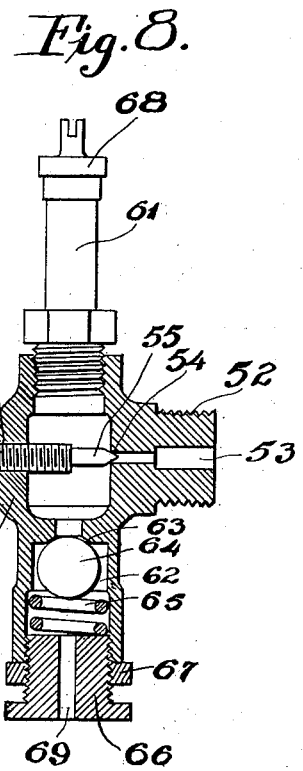
Figure 8 represents a section on line 8—8 of Figure 1, illustrating the construction of the air supply and control valve.
Figures 9, 10:
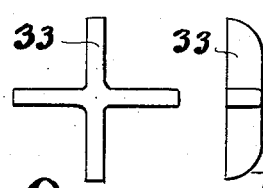
Figure 9 represents a plan view of the strainer reinforcing spider shown in Figure 7.
Figure 10 represents a side elevation of the same.
Figures 11, 12:
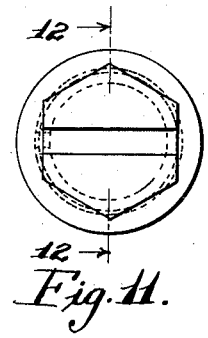
Figure 11 represents a plan view of the refill plug at the bottom of the reservoir for normally closing the opening through which the grease is supplied into the reservoir.
Figure 12 represents a section on line 12—12 of Figure 11.

An air-control valve unit 51, as shown detached in Figure 8, is provided at any suitable point on the tank 20, as shown in Figure 1, with the externally threaded portion 52 of said valve unit 51 screw-threaded into the top of the tank, or otherwise permanently affixed to the top of the tank, in operative communication therewith. The passageway 53, which is in direct communication with the interior of the tank 20, terminates in a valve seat 54, which is adapted to receive the screw operated needle valve 55. The needle valve 55 is provided with a screw-threaded stem portion 56, which is screw-threadedly mounted in the screw-threaded bore 57 of the housing 51, in axial alignment with the valve seat 54. The valve stem then continues externally and is provided with a manually operable handle 58. A packing gland 59 may be provided, surrounding the stem 56, and screw-threaded to the housing 51, for confining the packing gasket 60 around said stem 56. Into one side of the valve housing 51 a conventional air-valve 61 is screw-threadedly secured, as shown particularly in Figure 8, through which the air may be filled into the tank 20. The other side of the valve housing 51 is provided with a relief valve chamber 62, including the valve seat 63, which is adapted to receive a ball check valve or any other suitable check valve 64, which is urged against said valve seat 63 by the helical compression spring 65. The helical compression spring 65 is in turn supported and compressed to any suitable degree by the perforated retaining plug 66, which is screw-threaded into the end of the chamber 62. By screwing the plug 66 further into the chamber or out of the chamber 62, the pressure of the helical compression spring 65 may be varied so as to vary the seating pressure of the check valve 64. A screw-threaded lock nut 67 may be provided around the plug 66, so as to lock the setting of the plug 66.

In filling the air into the tank 20 (after the latter has been supplied with a suitable amount of lubricant), the cap 68 of the air valve 61 is removed and the air chuck of the compressed air hose applied to the end of the valve 61, while the needle valve 55 is opened. The air thus fills in through the passageway 53, into the tank 20, until the pressure within the tank reaches the specific pressure for which the check valve 64 has been set. This valve may be set for anywhere from 50 to 150 lbs. per square inch, more or less, depending upon the viscosity of the lubricant, the size of the tank, and certain other factors. A further application of the compressed air hose to the valve 61 will merely open the check valve 64, and force air out through the perforation 69 in the plug 66. When the air has been filled into the tank, the valve 55 is closed by means of the handle 58.

In the modification of my invention, illustrated particularly in Figures 2 and 3, a conical valve head 70 is secured to the lower end of the pipe 23, with the base of the cone at the bottom. One or more perforations 71 are provided in the conical wall of the valve head 70. A correspondingly conical valve member 72, carried by the guiding sleeve 73, is slidably mounted upon the pipe 23, as indicated in Figures 2 and 3. A float 74, of wood, cork or the like, or possibly formed of hollow metal construction, is affixed to the sleeve 73 and the conical valve member 72, so that said sleeve 73 and conical valve member 72 will be raised and lowered by said float 74;—the position of the latter being in turn controlled by the level of the liquid (grease or other lubricant) within the tank 20. Thus, when the tank contains a substantial amount of lubricant, as indicated in Figure 2, the float 74 will raise the conical valve member 72, so that the intake apertures or holes 71 of the conical valve head 70 are exposed and in a condition to admit grease or other lubricant into the pipe 23. When the level of the body of grease or other lubricant 75 drops however, the float 74 is also carried down until the conical valve member 72 seats upon the conical valve head 70, as indicated in Figure 3. In this position the apertures 71 are closed against the further admission of lubricant, or against the further admission of air which fills the tank 20 under pressure. By this means the admission of air into the pipe 23, and its passage through the metering device, is prevented.

In the modification of my invention shown particularly in Figure 5, the valve head 76 is provided with an upper flat surface having one or more apertures 77 extending therethrough, into the interior of the valve head 76. The float 78, in this modification of my invention, is provided with a flat sealing gasket or washer 79, of leather or other suitable material, which is carried down onto the valve head 76, so as to close the openings 77 thereof, and in this manner prevent the admission of grease or air into the valve head 76 and the pipe 23, when the level of grease has reached a certain low point.

In each of the modifications of my invention shown in Figures 3 and 5, I also provide a check valve 80, urged against any suitable valve seat 81, formed in the valve head 70 or 76, so as to prevent the grease or lubricant from emptying out of the pipe 23 when the valves 25 and 45 are open and the tank 20 is opened at the plug 48. The check valve 80 is urged by a helical compression spring 82, which in turn is supported by a cross-pin 83 extended through the pipe 23, as indicated in Figures 3 and 5. The pressure of the valve closing spring 82 is merely sufficient to keep the valve 80 seated against its valve seat, but not sufficient materially to hinder the ingress of grease or lubricant into the pipe 23 under the pressure of air contained within the tank 20.

If desired, the float 78, shown in the modification of my invention in Figure 5, may also be provided with suitable guiding sleeves, such as the guiding sleeve 73, shown in Figure 3.

An air release plug 84 may also be provided on top of the tank 20, for releasing all the compressed air from the tank prior to refilling the tank with grease.

In the normal operation of my novel grease dispensing device, the air is first released by means of the screw plug 84, and then the plug 48 is removed, while the tank is in a horizontal position, with the opening 47 on top. The grease is then poured in through the opening 47, until a sufficient amount has been placed into the tank 20. This causes the float 74 or 78 to be raised, or displaced towards the upper ends of the tank 20 along the pipe 23, when the tank is again positioned upright. The plug 48 is then replaced and screwed tight against the packing washer or gasket 85. Thereafter the air-release screw plug 84 is screwed into position. The needle valve 55 is then opened by means of the handle 58, and air is filled into the tank through the conventional air valve 61, until suitable pressure, either as indicated by the pressure gauge 86, or as indicated by the release of the check valve 84, has been attained within the tank 20. Then the needle valve 55 is closed by means of the handle 58. The main control valve 25 is then opened and the metered grease dispenser is ready for use. By opening the valve 45, any suitable amount of grease may be dispensed through the nozzle 46;—the amount of grease thus dispensed being accurately recorded on the meter 34. When the tank is near empty, the float 74 or 78 closes the intake end of the pipe 23, through the closing of the ports of the valve head 70 or the valve head 76, thereby preventing the false registration on the meter 34.

The air-release port 49, in the plug 48, is provided to release the air through said opening before the plug 48 is entirely unscrewed from the tank, should any air pressure remain in the tank through failure to open the release plug 84 prior to the removal of the plug 48. This prevents the plug 48 from being projected accidentally by the pressure of air within the tank.

In order to permit the metered grease dispenser to be moved about more readily, and in order to permit it to be placed on its side more readily for refilling, a pair of wheels 87 are secured to one side of the tank, upon an axle 88. An upright handle member 89 is also secured to the same side of the tank, having a crossed handle bar 90 mounted thereon, by means of which the tank may be manipulated upon the wheels 87. The lower end of the handle stem 89 is turned upwardly as at 91, so as to form a hook for the reception or hanging of the hose 44, if desired.

I am aware that the invention may be embodied in other specific forms without departing from the spirit or essential attributes thereof, and I therefore desire the present embodiments to be considered in all respects as illustrative and not restrictive, reference being had to the appended claims rather than to the foregoing description to indicate the scope of the invention.

Having thus described my invention, what I hereby claim as new and desire to secure by Letters Patent, is:—

1. A metered grease dispenser including a normally closed reservoir for containing a suitable quantity of grease or other lubricant and for containing compressed air on said grease or other lubricant; a metering device operatively connected to said reservoir having an intake pipe extending down into the reservoir in proximity to the bottom of the body of grease or other lubricant, a flexible discharge hose connected to said metering device, a manually operable valve for starting and stopping the flow of grease or other lubricant, through said intake pipe, said metering device and said hose, means for supplying air under pressure into said reservoir and for confining the same therein, means for supplying lubricant into said reservoir and for confining the same therein, a one-directional check valve for preventing the flow of fluid in said intake pipe from the metering device into the grease reservoir, a strainer intermediate the intake end of said intake pipe and said metering device, a conical valve head operatively carried by the lower end of said intake pipe and having an intake port, a float slidably mounted upon said intake pipe adapted to be buoyantly supported by the grease or other lubricant in said reservoir, and a conical valve port closure carried by said float for closing said intake port against the further ingress of grease or other lubricant and against the ingress of compressed air, when the level of grease or other lubricant reaches a suitable low point, thereby automatically to shut off the flow of lubricant and to prevent the passage of compressed air through the metering device.

2. A metered grease dispenser including a normally closed reservoir for containing a suitable quantity of grease or other lubricant and for containing compressed air on said grease or other lubricant; a metering device operatively connected to said reservoir having an intake pipe extending down into the reservoir in proximity to the bottom of the body of grease or other lubricant, a flexible discharge hose connected to said metering device, a manually operable valve for starting and stopping the flow of grease or other lubricant, through said intake pipe, said metering device and said hose, means for supplying air under pressure into said reservoir and for confining the same therein, means for supplying lubricant into said reservoir and for confining the same therein, a one-directional valve check for preventing a flow of fluid in said intake pipe from the metering device into the grease reservoir, a strainer intermediate the intake end of said intake pipe and said metering device, and the intake end of said intake pipe, a manually operable shut-off valve intermediate said strainer, a valve head operatively carried by the lower end of said intake pipe and having an upper valve seating surface with an intake port therethrough, a float slidably mounted upon said intake pipe adapted to be buoyantly supported by the grease or other lubricant in said reservoir, and a sealing gasket carried by said float for closing said intake port against the further ingress of grease or other lubricant and against the ingress of compressed air, when the level of grease or other lubricant reaches a suitable low point, thereby automatically to shut off the flow of lubricant and to prevent the passage of compressed air through the metering device.

ROBERT M. BAGLEY.